US005388080A

United States Patent [19]

Feintuch et al.

[11] Patent Number: 5,388,080

[45] Date of Patent: Feb. 7, 1995

[54] NON-INTEGER SAMPLE DELAY ACTIVE NOISE CANCELLER

[75] Inventors: Paul L. Feintuch, Covina; Allen K. Lo, Diamond Bar, both of Calif.

[73] Assignee: Hughes Aircraft Company, Los Angeles, Calif.

[21] Appl. No.: 53,738

[22] Filed: Apr. 27, 1993

[51] Int. Cl.[6] .......... H04B 15/00

[52] U.S. Cl. .......... 367/135; 367/901

[58] Field of Search .......... 367/901, 135, 1; 364/724.19, 724.1; 381/71

[56] References Cited

U.S. PATENT DOCUMENTS

| | | | |
|---|---|---|---|
| 3,997,772 | 12/1976 | Crochiere et al. | 364/724.1 |
| 4,038,536 | 7/1977 | Feintuch | 235/152 |
| 4,473,906 | 9/1984 | Warnaka et al. | 367/901 |
| 5,117,401 | 5/1992 | Feintuch | 367/135 |

OTHER PUBLICATIONS

"An Adaptive Recursive LMS Filter," P. L. Feintuch, *IEEE Proceedings*, vol. 64, No. 11, Nov. 1976.

*Primary Examiner*—Daniel T. Pihulic

*Attorney, Agent, or Firm*—W. K. Denson-Low

[57] ABSTRACT

An active adaptive noise canceller that inserts delays into the weight update logic of an adaptive filter to keep the filter stable. The noise and residual noise are sensed and the respective sensor signals are digitized at a given sample rate for processing in the adaptive filter. To eliminate the need for high sample rates while maintaining flexibility in the frequency regions over which the adaptive filter is stable, the delay introduced into the weight update logic is a non-integer multiple of the sample period. The non-integer sample delay is obtained by a sample interpolation and decimation procedure.

18 Claims, 4 Drawing Sheets

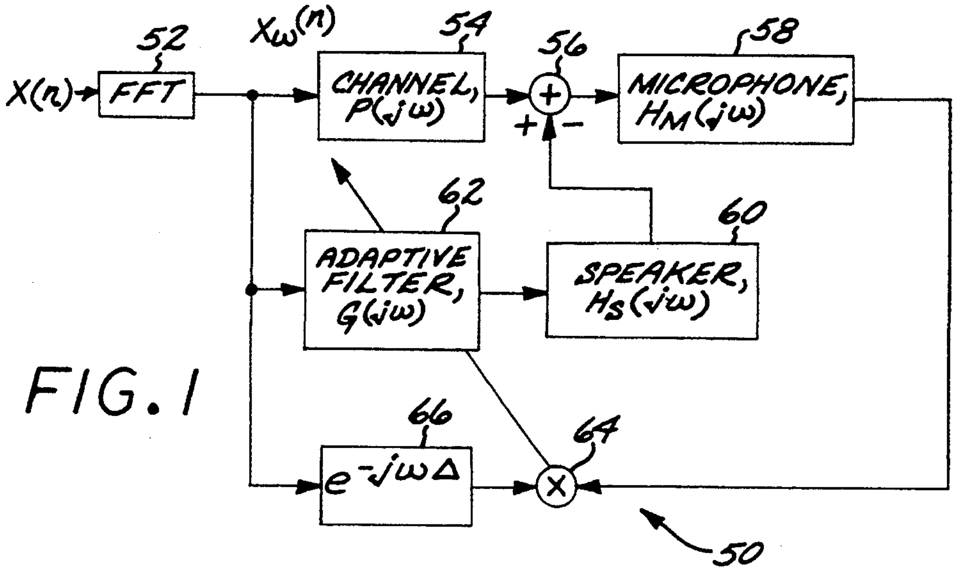
FIG. 1
FIG. 2
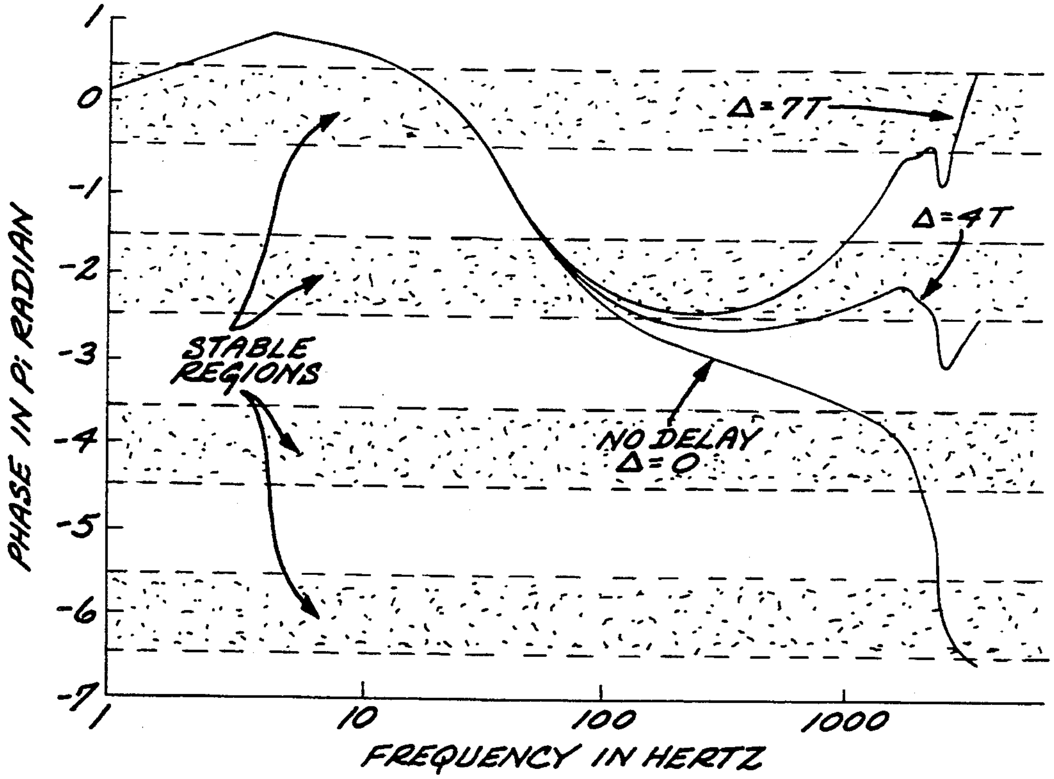

NON-INTEGER SAMPLE DELAY ACTIVE NOISE CANCELLER

BACKGROUND OF THE INVENTION

The present invention relates to active noise cancellation systems.

The objective in active noise cancellation is to generate a waveform that inverts a nuisance noise source and suppresses it at selected points in space. In active noise cancelling, a waveform is generated for subtraction, and the subtraction is performed acoustically, rather than electrically.

In a basic active noise cancellation system, a noise source or vibration is measured with a local sensor such as an accelerometer or microphone. The noise propagates acoustically over an acoustic channel to a point in space where noise suppression is desired, and at which is placed another microphone. The objective is to remove the acoustic energy components due to the noise source. The measured noise waveform from the local sensor is input to an adaptive filter, the output of which drives a speaker. The second microphone output at the point to be quieted serves as the error waveform for updating the adaptive filter. The adaptive filter changes its weights as it iterates in time to produce a speaker output that at the microphone looks as much as possible (in the minimum mean squared error sense) like the inverse of the noise at that point in space. Thus, in driving the error waveform to have minimum power, the adaptive filter removes the noise by driving the speaker to invert it.

Many previous active noise cancelers use the filtered-X LMS algorithm, which requires a training mode. The function of the training mode is to learn the transfer functions of the speaker and microphones used in the system so that compensation filters can be inserted in the feedback loop of the LMS algorithm to keep it stable. As the physical situation changes, the training mode must be reinitiated. For example, in an automobile application to suppress noise within a passenger compartment, the training mode may need to be performed again every time a window is opened, or another passenger enters the compartment, or when the automobile heats up during the day. The training mode can be quite objectionable to passengers in the vehicle.

Commonly assigned U.S. Pat. No. 5,117,401, the entire contents of which are incorporated herein by this reference, describes an active adaptive noise canceller which does not require a training mode. The insertion of a time delay in the computation of the weight updates modifies the frequency stability regions of the canceller. Hence, the canceller provides a mechanism through which the adaptive noise cancellation can be easily adapted to suit any application at hand by simply adjusting the time delay value to acquire the desired frequency stability regions.

In a canceller system employing delay in the filter weight updating, as described in U.S. Pat. No. 5,117,401, it is convenient to use delay values which are integer multiples of the digital sampling period. To provide the flexibility to insert relatively small time delays, which will result in a small change in the canceller frequency stability regions, it is necessary to employ relatively high sample rates.

It is therefore an object of the present invention to provide an active noise cancellation system employing an adaptive filter and a delay in the filter weight updating which can be a non-integer multiple of the sample period.

SUMMARY OF THE INVENTION

An active adaptive noise canceller in accordance with the invention includes a noise sensor for generating a noise sensor signal indicative of the noise to be suppressed, and digitizing means for digitizing the noise sensor signal at a given sample rate. The system also includes an acoustic sensor for generating an error signal indicative of the residual noise and second digitizing means for digitizing the error signal. An acoustic output device generates a noise cancelling acoustic signal.

Delay means are provided for delaying the digitized noise sensor signal by a preselected time delay. In accordance with this invention, the time delay is selected to be a non-integer multiple of a sample period determined by the digitization sample rate.

An adaptive filter having a plurality of inputs is responsive to the digitized noise-sensor signal, the delayed digitized noise sensor signal and the digitized error signal, and produces an output signal which drives the acoustic output device. The delay means causes the adaptive filter to be stable over one or more frequency stability regions and to not require a training mode, yet permits a reduction in the required sample rate to achieve stable operation in a desired frequency stability region.

BRIEF DESCRIPTION OF THE DRAWING

These and other features and advantages of the present invention will become more apparent from the following detailed description of an exemplary embodiment thereof, as illustrated in the accompanying drawings, in which:

FIG. 1 illustrates, in the frequency domain, an adaptive noise canceller (ANC) employing a delay in the weight updating to remove the necessity for a training mode.

FIG. 2 illustrates, for the canceller of FIG. 1, the phase response of the product of the speaker-microphone and time delay transfer functions.

DETAILED DESCRIPTION OF THE PREFERRED EMBODIMENT

Figures 3A, 3B, 3C, 3D:
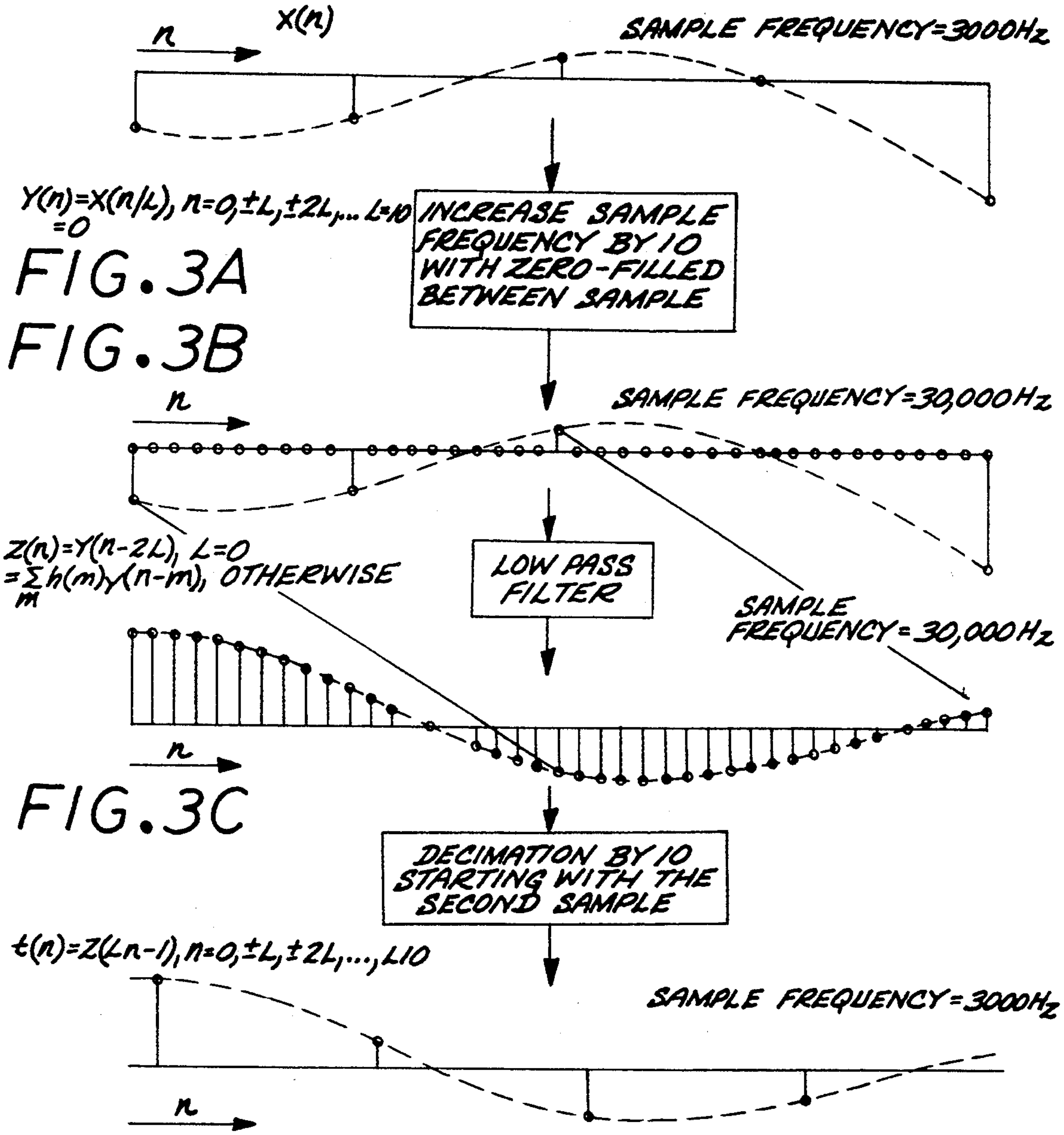
FIG. 3A–3D illustrate the mechanization of the non-integer sample delay process in accordance with the invention.

FIG. 1 depicts the frequency domain analog, for explanatory purposes, of the adaptive noise canceller (ANC) 50, more fully described in U.S. Pat. No. 5,117,401, which does not require a training mode. The frequency domain analog is discussed to illustrate the frequency stability regions of this canceller. The noise x(n) from a noise source is passed through a fast Fourier transform (FFT) function 52, and the resulting FFT components $x_\omega(n)$ are passed through the acoustic channel, represented as block 54, with a channel transfer function $P(j\omega)$. The ANC system 50 includes a microphone 58 with its transfer function $H_M(j\omega)$ and a speaker 60 with its transfer function $H_S(j\omega)$. The acoustic channel 54 inherently performs the combining function 56 of adding the channel response to the speaker excitation. The microphone 58 responds to the combined signal from combiner 56. The Fourier components are also passed through an adaptive LMS filter 62 with transfer function $G(j\omega)$. The filter weights are updated by the microphone responses, delayed by a time delay $\Delta$ (66).

It can be shown that the adaptive filter in the adaptive noise cancellation (ANC) system 50 depicted in FIG. 1 is stable in the frequency regions in which the real part of the product of the microphone-speaker and the delay line transfer functions is positive, i.e., Real $\{\exp(j\omega\Delta) H_m(j\omega)\}>0$.

A corollary to this inequality is that the phase of $\{\exp(j\omega\Delta)) H_m(j\omega)H_s(j\omega)\}$ must lie inside $(2n\pi-\pi/2, 2n\pi+\pi/2)$, $n=1, 2, \ldots$, i.e., the right side of the complex plane. The phase of $\{\exp(j\omega\Delta)h_m(j\omega)H_s(j\omega)\}$ is plotted in FIG. 2 where, for this example, $H_m(j\omega)$ and $H_s(j\omega)$ are modelled by a Tchebychev and a Butterworth filter, respectively. In this example and for the case of no delay, i.e., $\Delta=0$, the stability regions of the adaptive filter can be found by locating the phase of $\{\exp(j\omega\Delta) H_m(j\omega)H_s(j\omega)\}$ within the stippled bands. The bands fall approximately from 1 to 2 Hz, 17 to 42 Hz, 70 to 170 Hz, 1500 to 2900 Hz, and 3400 to 5000 Hz. Based on the sample frequency of 10,000 Hz, the insertion of a delay equal to 7 samples provides an upward bending of the phase curve to the speaker-microphone phase response function, such that the stability regions now have changed to approximately 1 to 2 Hz, 17 to 42 Hz, 70 to 1400 Hz and 3000 to 5000 Hz.

"Frequency stability region" in the context of an ANC system is defined as a frequency region in which the adaptive filter is stable when operated to suppress disturbing signals within this frequency range. Conversely, the adaptive filter cannot be kept stable absolutely when it is excited by signals that fall outside of this region. In the example shown in FIG. 2, the insertion of a 7 sample delay, based on a sampling frequency of 10,000 Hz, has extended the frequency stability region from 70 to 1400 Hz as compared to 70 to 170 Hz with no delay. The insertion of 7 samples (or 0.7 millisecond) of delay can be easily accomplished in this example since the sample frequency is 10,000 Hz, which is substantially higher than the required Nyquist rate of 3,000 ($\sim 2\times 1400$) Hz if the frequency stability region also represents the frequency band of interest. On the other hand, producing a 0.7 millisecond delay would present a problem with a delay scheme using integer tap-delays if a lower sample frequency is required for the purpose of reducing processing requirements. This invention circumvents this problem by using a digital processing technique for generating non-integer sample delays, thereby allowing a lower sample frequency. This technique of digitally generating non-integer sample delay values involves digital interpolation and decimation processing which can be viewed mathematically as filtering.

To illustrate this process, suppose it is desired to lower the sample frequency from 10,000 Hz in the above example to 3,000 Hz, but to retain the same time delay requirement of 0.7 millisecond. The interpolation and decimation procedure in fulfilling this delay involves first the interpolation of the time series to a sample frequency of 30,000 Hz. The next step of this process is to select the desired time delayed sample which, when decimated by a factor of ten, will produce the desired time delayed series.

There are several known methodologies for digital resampling. As an example to illustrate the invention, the technique described in "New Results in the Design of Digital Interpolators," G. Oetken et al., IEEE Trans. Acoust., Speech, Signal Processing, Vol. ASSP-23, pp. 301–309, June, 1975, is ideally suited for this application since its filter response produces minimum distortion to the original input data sequence. The entire contents of this reference is enclosed herein by this reference. The impulse response of the filter resulting from this design technique takes on a modified form of sin(x)/x, which theoretically produces error-free interpolation when an infinite number of input samples are used. There are many other digital resampling processes which could alternatively be employed in an ANC system in accordance with the invention.

Figure 4:
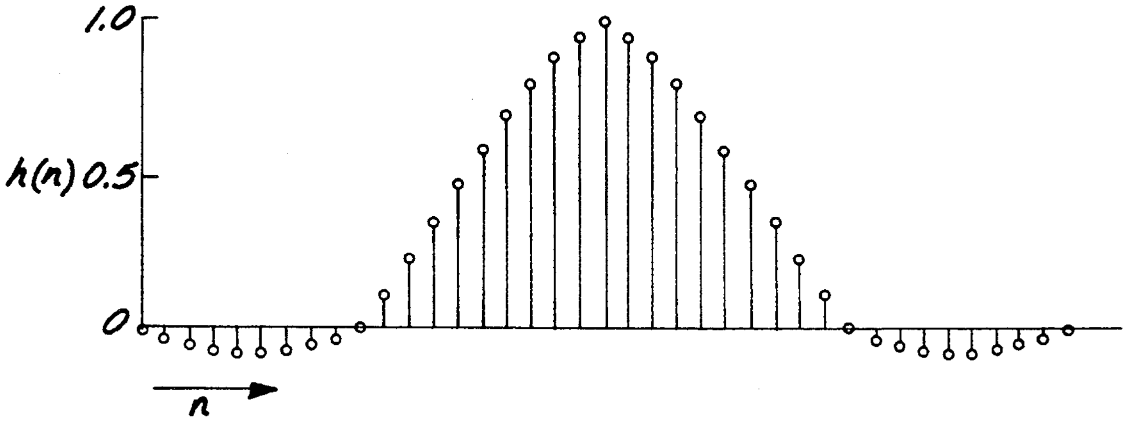
FIG. 4 shows the impulse response of a low pass filter for sample interpolation.

FIGS. 3A–3D illustrate the mechanization of the non-integer sample delay process, which is a variation of the digital resampling. Using the above example, the steps involved in this process can be described as follows. The input time series (FIG. 3A) is first zero-filled between samples with 9 zeros which effectively increases the original sample frequency from 3,000 Hz to 30,000 Hz (FIG. 3B). The new time series is then input to a lowpass filter (FIG. 3C). The design of this lowpass filter is based on the design procedure described in Oetken et al. In considering the problem at hand, using a maximum of four 3,000 Hz input samples to generate one 30,000 Hz sample seems to be ideal. The impulse response of the resulting filter which exhibits a form of sin(x)/x truncated at the first two sidelobes is shown in FIG. 4. Since this is a causal system which cannot produce its output prior to receiving an input, the filter will introduce a bulk time delay which has to be accounted for as part of the overall delay introduced by the process. In this case, the bulk delay is 20 sample intervals (or 2 sample intervals at 3,000 Hz rate) or 0.667 millisecond as indicated by the location of the peak response of the filter. This filter bulk-delay is also the reason for selecting 4 input-sample interpolation for the example, since two more input samples for interpolation will result in another delay of ten additional samples at the output, exceeding the time delay requirements of 0.7 millisecond. This lowpass filter allows the original input time series to be reconstructed error-free because of its sin(x)/x—like property. Since the required delay is 0.7 millisecond and the filter bulk delay provides only 0.667 millisecond, an additional 0.0333 millisecond of delay, which equals exactly one sample interval at 30,000 Hz, is needed to satisfy the requirement. With one additional delay and decimation inserted at the output of the lowpass filter (FIG. 3D), the time series which satisfies the delay requirement is obtained.

It is a common practice in digital signal processing to make the calculations more efficient by eliminating arithmetic that involves zero values and intermediate computations that are not needed to generate the output. Since the described non-integer sample delay process includes many multiplications involving zeros by the virtue of the zero-fill operation and the decimation of a finite impulse response (FIR) filter output which has no feedback of the output, the required computations for this process can be significantly reduced. For this example, if all multiplications involving zero and all computations in generating discarded output samples are eliminated, the mechanization of this non-integer sample delay process is an exact equivalent of a 4-tap FIR filter. To realize an additional 0.0333 millisecond delay as required, in the example, the set of coefficients which represents a subset of the filter coefficients, h(n), n=0, 1, 2, . . . 39 shown in FIG. 4 is $$h'(n)=h(Ln+1),$$

where n=0, 1, 2, 3, and L=10.

In general, if a delay of 0.667+k0.0333 millisecond is desired, the filter coefficients that will produce the delay may be obtained from h(n) as follows $$h'(n)=h(Ln+k),$$

where k=0, 1, 2, . . . , 9. In this expression k is limited to a range of values from 0 to 9, which means the valid range of time delays as applied to this example is limited to form 0.667 to 1.0 millisecond. To achieve time delays greater than 1 millisecond, additional integer sample delay to the input can be inserted prior to the non-integer delay process. For example, assume it is required to insert x milliseconds delay to achieve stability in a frequency region of interest for the example described earlier. Meeting this design objective encompasses the use of a cascaded delay process involving first an integer delay of d samples followed by the non-integer delay process, where d is determined based on the inequality as shown below.

$$0.667<(x-d)(0.333)<1.0$$

To achieve time delays less than 0.667 millisecond, on the other hand, the input sample frequency in increased to a rate such that the required delay is greater than the bulk delay (which is two sample intervals as in this example).

Figure 5:
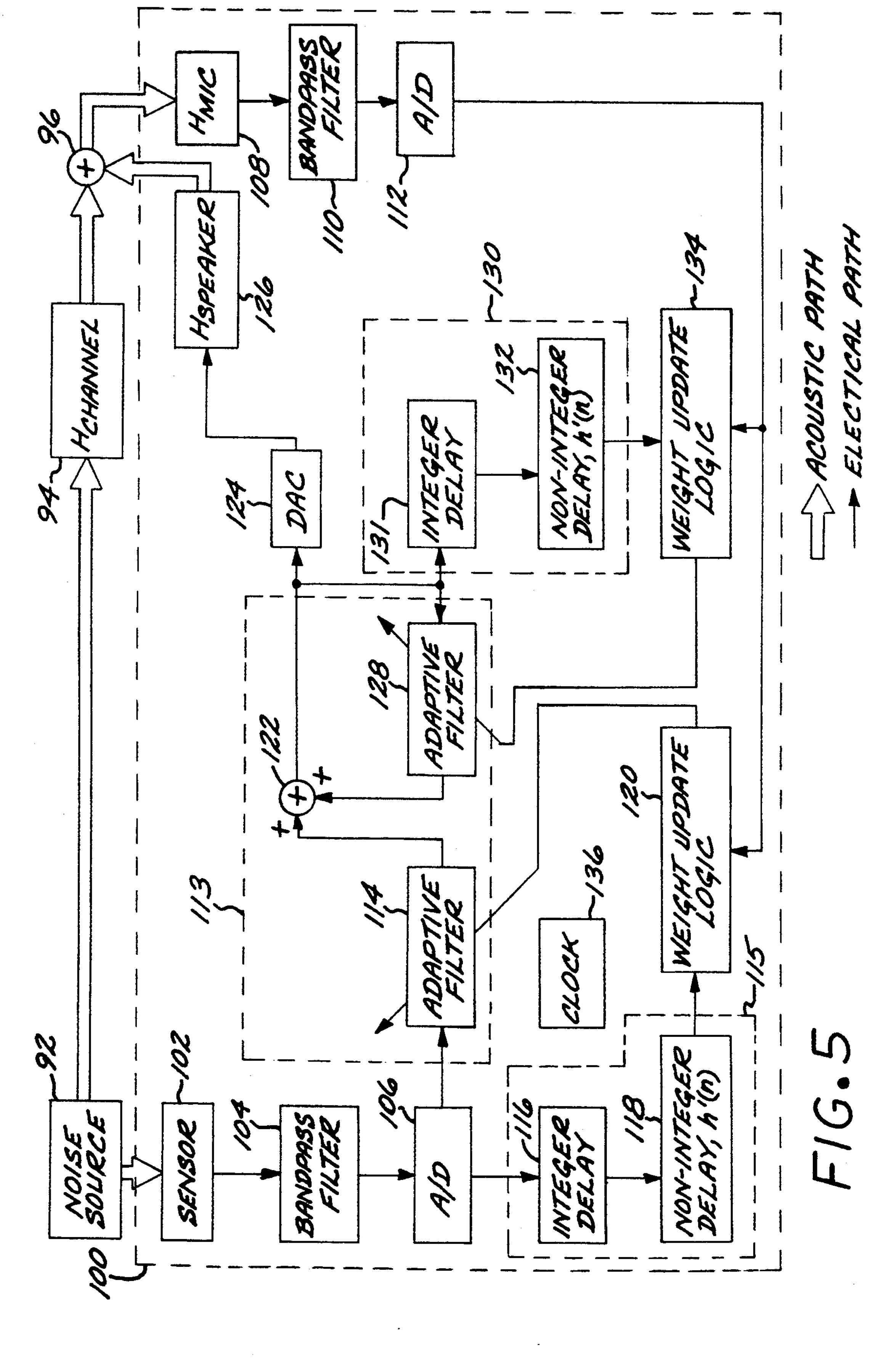
FIG. 5 is a schematic block diagram of an ANC employing a non-integer delay in the weight updating in accordance with this invention.

An ANC system 100 embodying the non-integer sample delay process is shown in FIG. 5. A noise source 92 emits acoustic noise signals which are to be quieted by the ANC system; the noise signals propagate over an acoustic channel 94. The acoustic channel inherently subtracts the acoustic energy emitted by speaker 126 comprising the ANC system from the noise energy emitted by source 92. The system includes a noise acoustic sensor 102, which generates an electrical noise signal which is filtered by bandpass filter 104. The passband of the filter 104 determines the frequency of noise cancelling operation of the system 100, as is more particularly described in commonly assigned, co-pending application "Multiple Adaptive Filter Active Noise Canceller," Ser. No. 08/053,728, filed Apr. 27, 1993, by P. L. Feintuch and A. K. Lo, attorney docket PD 92306, the entire contents of which are incorporated herein by this reference. The filtered noise signal is digitized by analog-to-digital converter (ADC) 106.

The system 100 further includes an error microphone 108 placed at or near the point or points in space which are to be quieted. The microphone 108 generates an electrical signal indicative of the residual noise, and the microphone signal is passed through another bandpass filter 110 having the same passband as filter 104. The filtered error signal is digitized by ADC 112.

The digitized filtered noise signal drives a recursive adaptive LMS filter 113 which employs the LMS algorithm. The filter 113 comprises a feed-forward adaptive filter 114, a feed-backward adaptive filter 128, and summing node 122, and is updated in the manner described in the article entitled "An Adaptive Recursive LMS Filter," by P. L. Feintuch, *IEEE Proceedings*, Vol. 64, No. 11, November 1976. The digitized filtered noise signal is also passed through an interpolation filter 115, comprising an integer delay 116, i.e., a delay which is an integer multiple of the sample period of the ADC 106, and through a non-integer delay 118, h' (n), as discussed above. The delayed, filtered noise signal is coupled as an input to the weight update logic 120, together with the digitized error signal from ADC 112. The weight update logic 120 updates the filter weights for the adaptive filter 114, based on these input data values.

The output from the adaptive filter 114 is summed at summing node 122 with the output from a second adaptive filter 128 employing an LMS algorithm, in a recursive relationship, with the summed signal driving the filter 128. The summed signal is also delayed by a second interpolation filter 130 comprising integer delay 131 and non-integer delay 132, and then provided to the weight update logic 134 as an input together with the digitized error signal from ADC 112. The digitized summed signal from summing node is also converted to analog form at digital-to-analog converter (ADC) 124, and the resulting analog signal drives the acoustic transducer or speaker 126.

The ADCs 106 and 112 are operated at a given sample rate, as determined by a common clock 136. The clock 136 also clocks the active digital elements, e.g., the interpolation filters 116 and 130, the weight update circuits 120 and 134, and the adaptive filters 114 and 128. In accordance with the invention, the delay introduced by delay 118 can be a non-integer multiple of the sample period of the devices 106 and 112. As a result, the system 100 can be operated at a lower sample rate in order to reduce the computational burden, while at the same time retaining the benefits of stable operation in the frequency stability regions of the system.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. An active adaptive noise canceller for suppressing noise signals derived from a noise source, said canceller comprising:

a noise sensor for generating a noise sensor signal indicative of said noise to be suppressed;

first digitizing means for digitizing said noise sensor signal at a given sample rate;

an acoustic sensor for generating an error signal indicative of the residual noise;

second digitizing means for digitizing said error signal at said sample rate;

an acoustic output device for generating a noise cancelling acoustic signal;

delay means for delaying said digitized noise sensor signal by a preselected time delay, said time delay selected to be a non-integer multiple of a sample period determined by said sample rate;

adaptive filter means having a plurality of inputs responsive to said digitized noise sensor signal, said delayed digitized noise sensor signal and said digitized error signal, and an output signal coupled to said acoustic output device; and wherein said delay means causes said adaptive filter to be stable over one or more frequency stability regions and to not require a training mode, and said selected non-integer multiple of said sample period permits a reduction in the required sample rate to achieve stable operation in a selected frequency stability region.

2. The canceller of claim 1 wherein said delay means comprises a low pass filter.

3. The canceller of claim 1 wherein said delay means comprises digital interpolation means for performing a digital interpolation function on said digitized noise sensor signal, and digital decimation means for decimating said interpolated noise sensor signal.

4. An active adaptive noise canceller for suppressing noise signals derived from a noise source, said canceller comprising:

a noise sensor for generating a noise sensor signal indicative of said noise to be suppressed;

first digitizing means for digitizing said noise sensor signal at a given sample rate;

an acoustic sensor for generating an error signal indicative of the residual noise;

second digitizing means for digitizing said error signal at said sample rate;

an acoustic output device for generating a noise cancelling acoustic signal;

delay means for delaying said digitized noise sensor signal by a preselected time delay selected to be a non-integer multiple of a sample period determined by said sample rate, said delay means comprising digital interpolation means for performing a digital interpolation function on said digitized noise sensor signal, and digital decimation means for decimating said interpolated noise sensor signal, wherein said delay means comprises means for zero filling said digitized noise signal to emulate a noise signal digitized by an emulated sample frequency which is increased relative to said sample rate, low pass filter means for filtering said zero-filled digitized noise signal, and means for decimating said filtered, zero-filled digitized noise signal, commencing with a second sample of said filtered, zero-filled digitized noise signal; and adaptive filter means having a plurality of inputs responsive to said digitized noise sensor signal, said delayed digitized noise sensor signal and said digitized error signal, and an output signal coupled to said acoustic output device, whereby said delay means causes said adaptive filter to be stable over one or more frequency stability regions and to not require a training mode, yet permits a reduction in the required sample rate to achieve stable operation in a selected frequency stability region.

5. The canceller of claim 4 wherein said emulated sample frequency is ten times said sample rate, and said means for decimating comprises means for decimating said filtered, zero-filled digitized noise signal by a factor of ten.

6. The canceller of claim 1 wherein said delay means comprises a first delay means for providing a delay selected to be an integer multiple of said sample period, and a second delay means for providing a delay selected to be said non-integer multiple of said sample period, wherein the total delay introduced by said delay means is equal to the sum of said integer multiple of said sample period and said non-integer multiple of said sample period.

7. The canceller of claim 1 wherein said adaptive filter means comprises weight update means for updating adaptive filter weight inputs, said update means responsive to said delayed digitized noise sensor signal and to said digitized error signal.

8. The canceller of claim 1 wherein said adaptive filter means comprises digital recursive adaptive filter means.

9. An active adaptive noise canceller for suppressing noise signals derived from a noise source, said canceller comprising:

a noise sensor for generating a noise sensor signal indicative of said noise to be suppressed;

first digitizing means for digitizing said noise sensor signal at a given sample rate;

an acoustic sensor for generating an error signal indicative of the residual noise;

second digitizing means for digitizing said error signal at said sample rate;

an acoustic output device for generating a noise cancelling acoustic signal;

delay means for delaying said digitized noise sensor signal by a preselected time delay, said time delay selected to be a non-integer multiple of a sample period determined by said sample rate; and adaptive filter means having a plurality of inputs responsive to said digitized noise sensor signal, said delayed digitized noise sensor signal and said digitized error signal, and an output signal coupled to said acoustic output device, said adaptive filter means comprising recursive adaptive filter means comprising:

a first adaptive filter responsive to said digitized noise signal and comprising a plurality of first adaptive filter weight inputs, said first adaptive filter providing a first adaptive filter output;

a first weight update means responsive to said delayed digitized noise sensor signal and to said digitized error signal for adaptively updating said first adaptive filter weight inputs;

a second adaptive filter for providing a second adaptive filter output;

means for combining said first and second adaptive filter outputs to provide said output signal coupled to said acoustic output device;

said second adaptive filter responsive to said output signal and comprising a plurality of second adaptive filter weight inputs;

second delay means for delaying said output signal by said preselected time delay; and a second weight update means responsive to said delayed output signal and to said digitized error signal for adaptively updating said second adaptive filter weight inputs, whereby said delay means causes said adaptive filter to be stable over one or more frequency stability regions and to not require a training mode, yet permits a reduction in the required sample rate to achieve stable operation in a selected frequency stability region.

10. An active adaptive canceller employing an adaptive filter to process digitized noise and error signals to produce an output to drive an acoustic output device to produce a cancelling waveform, and delay means to delay by a preselected time delay the noise signals used in a weight update circuit to update filter weights associated with said filter throughout noise cancelling operation, and wherein said noise signal is digitized at a preselected sample rate with an associated sample period, said delay means comprising means for delaying said noise signals by a selected non-integer multiple of said sample period to thereby cause said adaptive filter to be stable over one or more frequency stability regions and to not require a training mode, and said selected non-integer multiple permits a reduction in the required sample rate to achieve stable operation in a selected frequency stability region.

11. The canceller of claim 10 wherein said delay means comprises low pass filter means.

12. The canceller of claim 10 wherein said delay means comprises digital interpolation means for performing a digital interpolation function on said digitized noise sensor signal, and digital decimation means for decimating said interpolated noise sensor signal.

13. An active adaptive canceller employing an adaptive filter to process digitized noise and error signals to produce an output to drive an acoustic output device to produce a cancelling waveform, and delay means to delay by a preselected time delay the noise signals used in a weight update circuit to update filter weights associated with said filter, said delay means comprising digital interpolation means for performing a digital interpolation function on said digitized noise sensor signal, and digital decimation means for decimating said interpolated noise sensor signal, and wherein said noise signal is digitized at a preselected sample rate with an associated sample period, said delay means comprising means for delaying said noise signals by a non-integer multiple of said sample period, comprising means for zero filling said digitized noise signal to emulate a noise signal digitized by an emulated sample frequency which is increased relative to said sample rate, low pass filter means for filtering said zero-filled digitized noise signal, and means for decimating said filtered, zero-filled digitized noise signal, commencing with a second sample of said filtered, zero-filled digitized noise signal.

14. The canceller of claim 13 wherein said emulated sample frequency is ten times said sample rate, and said means for decimating comprises means for decimating said filtered, zero-filled digitized noise signal by a factor of ten.

15. The canceller of claim 10 wherein said delay means comprises a first delay means for providing a delay selected to be an integer multiple of said sample period, and a second delay means for providing a delay selected to be said non-integer multiple of said sample period, wherein the total delay introduced by said delay means is equal to the sum of said integer multiple of said sample period and said non-integer multiple of said sample period.

16. The canceller of claim 10 wherein said adaptive filter means comprises weight update means for updating adaptive filter weight inputs, said update means responsive to said delayed digitized noise sensor signal and to said digitized error signal.

17. The canceller of claim 10 wherein said adaptive filter means comprises digital recursive adaptive filter means.

18. An active adaptive canceller employing an adaptive filter to process digitized noise and error signals to produce an output to drive an acoustic output device to produce a cancelling waveform, and delay means to delay by a preselected time delay the noise signals used in a weight update circuit to update filter weights associated with said filter, and wherein said noise signal is digitized at a preselected sample rate with an associated sample period, said delay means comprising means for delaying said noise signals by a non-integer multiple of said sample period, said adaptive filter means comprises recursive adaptive filter means comprising:

a first adaptive filter responsive to said digitized noise signal and comprising a plurality of first adaptive filter weight inputs, said first adaptive filter providing a first adaptive filter output;

a first weight update means responsive to said delayed digitized noise sensor signal and to said digitized error signal for adaptively updating said first adaptive filter weight inputs;

a second adaptive filter for providing a second adaptive filter output;

means for combining said first and second adaptive filter outputs to provide said output signal coupled to said acoustic output device;

said second adaptive filter responsive to said output signal and comprising a plurality of second adaptive filter weight inputs;

second delay means for delaying said output signal by said preselected time delay; and a second weight update means responsive to said delayed output signal and to said digitized error signal for adaptively updating said second adaptive filter weight inputs.

* * * * *